United States Patent [19]

Canat

[11] Patent Number: 5,076,995
[45] Date of Patent: Dec. 31, 1991

[54] SHOCK DAMPING DEVICE FOR NEUTRON ABSORBING BARS

[75] Inventor: Jean-Noël Canat, Lyons, France

[73] Assignees: Framatome, Courbevoie; Compagnie Generale des Matiéres Nucleaires, Velizy Villacoublay, both of France

[21] Appl. No.: 130,584

[22] Filed: Dec. 9, 1987

[30] Foreign Application Priority Data

Dec. 10, 1986 [FR] France ................. 86 17290

[51] Int. Cl.⁵ .............................. G21C 7/20
[52] U.S. Cl. ........................ 376/234; 376/225
[58] Field of Search ............. 376/234, 225, 362, 364

[56] References Cited

U.S. PATENT DOCUMENTS

| | | |
|---|---|---|
| 3,212,979 | 10/1965 | Silverblatt . |
| 3,346,459 | 10/1967 | Prince et al. .............. 376/225 |
| 4,024,018 | 5/1977 | Barnes ..................... 376/234 |
| 4,035,230 | 7/1977 | Bevilacqua . |
| 4,655,990 | 4/1987 | Leclercq .................. 376/225 |
| 4,675,151 | 6/1987 | Leclerq . |
| 4,762,661 | 8/1988 | Leclercq et al. .......... 376/234 |

FOREIGN PATENT DOCUMENTS 0159509 10/1985 European Pat. Off. .

Primary Examiner—Harvey E. Behrend
Attorney, Agent, or Firm—Pollock, Vande Sande & Priddy

[57] ABSTRACT

A device for damping the fall of a neutron absorbing bar on the upper end piece of a nuclear fuel assembly, typically a PWR, comprises at least one pair of cylinder-piston sets which are located symmetrically with respect to the vertical axis of the fuel assembly. One of the cylinder and piston in each set is carried by a fixed plate secured to the upper end piece. The other of the cylinder and piston is fixed to a movable plate arranged to receive the bar upon fall thereof and to move vertically toward the fixed plate, damping being achieved by the head loss impressed to the fluid forced out of the cylinders.

9 Claims, 1 Drawing Sheet

SHOCK DAMPING DEVICE FOR NEUTRON ABSORBING BARS

BACKGROUND OF THE INVENTION

1. Field of the Invention

The invention relates to device for absorbing shock upon the fall of neutron absorbing bars in a nuclear reactor fuel assembly cooled by a substantially incompressible fluid, such as a liquid, of the type including a piston and a cylinder, providing a restricted fluid leak path out of the cylinder when the piston is driven into the cylinder from a rest position into which the piston is urged by spring means.

The invention applies more particularly to reactors whose absorbing bars each include a cluster of parallel neutron absorbing rods fixed to arms of a spider having a central pommel or hub connectable to a driving mechanism for vertical movement. It is particularly suitable for use in reactors cooled and moderated by pressurized water (PWRs).

Neutron absorbing bars of the above kind, whose rods contain a neutron poison, are used for controlling the reactivity in the core of the reactor, by inserting the rods to a greater or lesser extent. To cause an emergency shut down of the reactor, all control bars are simultaneously dropped into the core by releasing them so that they are driven into the core by their own weight.

2. Prior Art

If has already been proposed to provide a neutron absorbing bar with a shock absorber to limit the load when the pommel comes into abutment against the upper core plate of the reactor or against the upper end piece of the fuel assembly with which it is associated.

European 159,059 describes a shock absorbing device of the above-defined type having a cylinder formed in the pommel. A piston slidably received in the cylinder is urged into a downward projecting position by resilient means contained in the cylinder. From the moment when the piston comes into abutment against the upper core plate, downward movement is braked by the compression of the resilient means and by the head loss undergone by the liquid which flows out of the cylinder between the wall thereof and the piston.

Such a shock absorbing device is of limited efficiency. The shock absorbing effect provided by the head loss undergoes practically no change during movement of the piston and only the increasing stiffness of the spring ensures progressivity. Since the device is integrated in the pommel, it interferes with liquid flow and cooling. The device is not easily removable for replacement or re-use on another cluster.

Another arrangement which is widely used for absorbing the load upon falling of the bars uses the head loss imparted to the coolant flow driven by the rods out of the guide tubes during the fall of the bar. For increasing the head loss, a restriction is formed at the lower part of the tubes: that approach involves troublesome constraints as far as the construction of the guide tubes is concerned and it increases their cost.

SUMMARY OF THE INVENTION

It is an object of the invention to provide an improved shock absorbing device which is distinct and possibly separable from the components whose abutment generates the load to be reduced. It is a more specific object of the invention to improve the distribution of the stresses without appreciably hindering coolant flow during normal operation of the reactor.

To attain these results, the invention uses the fact that, contrary to the presently used nuclear fuel assemblies, assemblies under design are not held in position in the reactor core by an upper core plate bearing on the upper end piece or nozzle of the assembly, but by means which do not hinder access to the upper end nozzle. Reference may be made, for example, to European 156,686 for a description of an example of such assemblies.

According to the invention, in a device of the above-defined type, the cylinder and piston means includes at least one pair of piston receiving cylinders disposed symmetrically with respect to the axis of the fuel assembly, and said cylinder and piston means is interposed between a plate fixed to the upper end piece of the fuel assembly and an axially movable plate disposed to receive the impact of the bar.

The device may be non releasably fixed to the upper end piece or alternatively removably fixed so that it may be used on several successive assemblies. In the latter case, it is sufficient for the plate fixed to the assembly to be removably mounted on the upper end piece, which may then be a flat base plate. To reduce the head loss undergone by the coolant when passing through the device, the axial part of the plate fixed to the upper end piece may be deformed upwardly and/or the base plate receiving the bar may have a central part which is offset downwardly.

In order to provide a restricted leak path, each cylinder may be dimensioned so as to provide a radial clearance about the piston and/or may be formed with pairs of radial holes evenly distributed along the path of the piston. The resilient means may include a helical spring encircling each cylinder-piston assembly, between the two plates.

BRIEF DESCRIPTION OF THE DRAWINGS

The invention will be better understood from the following description of a particular embodiment given by way of example. The description refers to the accompanying drawings.

DESCRIPTION OF A PREFERRED EMBODIMENT

Figure 1:
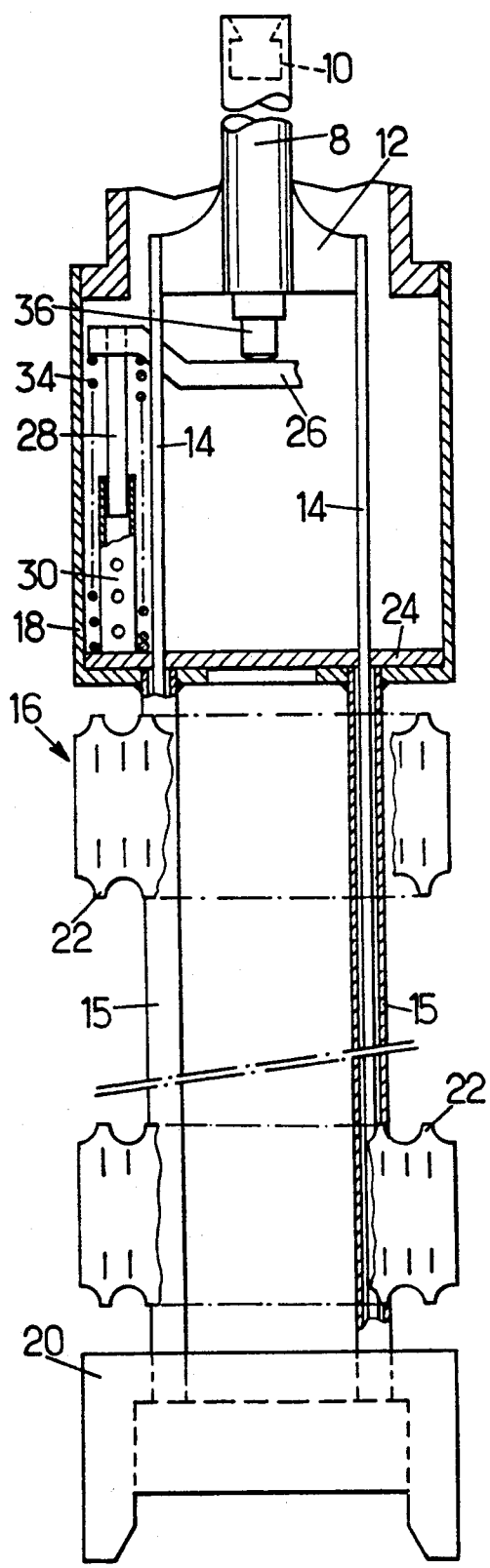
FIG. 1 is an elevational diagrammatic view in partial section, showing the elements of a fuel assembly to which the invention applies.

The device which will now be described can be used in PWRs in which each neutron absorbing bar includes a pommel or hub 8 having means 10 for connection to a drive shaft (not shown) and radial arms or fins 12 which carry rods 14. In the position of the cluster shown in FIG. 1, the rods are engaged in guide tubes 15 of a fuel assembly 16.

The invention may be used not only in connection with the neutron absorbing bars which are control bars whose rods contain a neutron poison; it is also suitable for use in connection with bars for shifting the neutron energy spectrum in the core.

Referring to FIG. 1, an upstanding fuel assembly 16 is of generally known construction: it includes an upper end piece 18 and a lower end piece 20 connected together by guide tubes 15; it further includes transverse grids 22 spaced apart along the guide tubes 15 and supporting the fuel elements (not shown) in position.

A shock absorbing device fixed to the upper end piece 18 includes a plate 24 securely connected to end piece 18. Plate 24 will be designated hereafter "fixed plate".

The device includes a second plate 26 located to receive the impact of pommel 8 upon fall of the bar and to move vertically with respect to the fixed plate 24. Plate 26 will be designated "movable plate".

Figure 2:
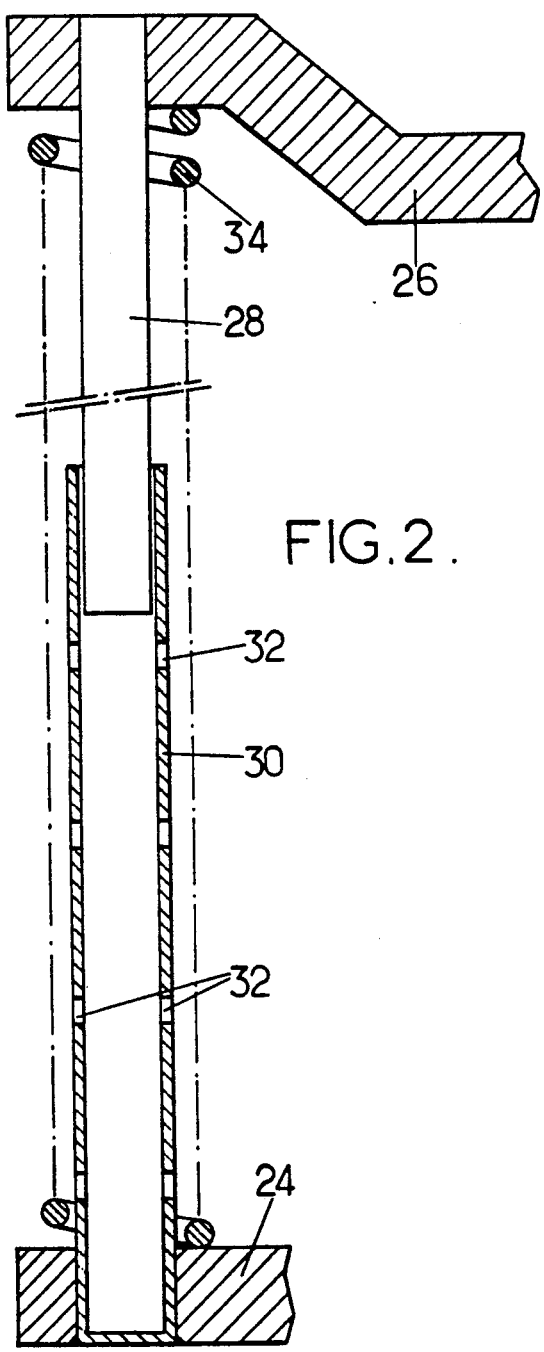
FIG. 2 is an enlarged view of one of the piston-cylinder assemblies of the device of FIG. 1.
Figure 3:
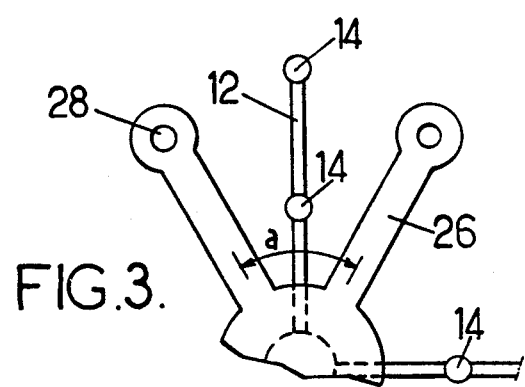
FIG. 3 is a partial bottom view showing a possible distribution of the piston-cylinder assemblies with respect to the rods of a bar.

One or more pairs of cylinder-piston sets are interposed between plates 24 and 26. The sets of a same pair are placed symmetrically with respect to the axis of the fuel assembly. As shown in FIG. 3, four cylinder-piston sets are provided, along two radial directions forming an angle A different from 90°. Each piston 28 is fixed to an arm of plate 26 which is angularly offset from fins 12, and it is slidably received in a respective cylinder 30 secured to the fixed plate 24. Each cylinder 30 may have a thin wall, since the pressure forces which it undergoes are small. An annular clearance of small radial width (some tenths of a millimeter, for example) is formed between piston 28 and cylinder 30 to provide a fluid leak path where the fluid flow is throttled. To limit the overpressure inside the cylinders 30 and the stresses on the structures, and to improve progressively, a plurality of pairs of holes 32 (FIG. 2) are formed at evenly spaced intervals along the cylinder 30. The cross-sectional flow area of the holes across the wall and their mutual spacings are selected to maintain the pressure which prevails in the cylinders 30 at a value as constant as possible during the downward stroke of the piston 28, while absorbing energy sufficiently to reduce the speed of the bar to a very low value when the pistons arrive at the end of their stroke.

A helical spring 34 is placed coaxially with each cylinder and is compressed between plates 24 and 26. Springs 34 have two roles. They hold the movable plate 26 in an upper position when the cluster does not load them and reset the shock absorbing device when the cluster is lifted. They participate in energy absorption when the movable plate 26 receives the pommel of the cluster. The pommel may accommodate a supplemental shock absorber 36 of conventional nature and small longitudinal size.

The device which has just been described operates as follows.

When the downwardly moving pommel strikes the movable plate 26, the speed of the pommel is maximum. The fluid contained in cylinders 30 is forced by the pistons out of the cylinders through holes 32 and upwardly through the annular clearance. Although the total head loss coefficient of the leak path is small (due to the small length of the path), the head loss undergone by the fluid may be high since the speed is maximum. In addition, the upwardly directed fluid jet out of the annular leak exerts a braking force on the movable plate 26. The return force exerted by spring 34 is minimum.

At the half way point in the stroke of the piston 28, the downward speed has appreciably decreased. But the leak cross-sectional flow area is smaller because the pistons have masked pairs of leak holes. The head loss coefficient has increased appreciably due to the lesser number of holes and lengthening of the annular leak path. Springs 34 oppose an increased resistance to downward movement.

Thus compensation is obtained which makes it possible to maintain the pressure in the cylinders 30 at an approximately constant value.

At the end of the stroke, just before stop, the leak cross-sectional flow area is minimum and the head loss coefficient, as well as the compression force of the spring, is maximum. Again, a compensation effect is obtained, since speed is low.

Then the movable plate takes an equilibrium position in which spring 34 exerts an upwardly directed force which balances the weight of the cluster.

The movable plate 26 may advantageously have the dished shape shown in FIG. 1 which minimizes flow hindrance during normal operation of the reactor. The fixed plate 24 may have an upwardly convex shape for the same purpose.

I claim:

1. In a nuclear reactor having an upstanding nuclear fuel assembly immersed in a substantially non-compressible fluid, a neutron absorbing bar normally positioned at least partly above said fuel assembly, said nuclear fuel assembly having means to allow insertion of said neutron absorbing bar therein, a device for absorbing the load caused by a fall of said neutron absorbing bar, said device comprising:

at least one pair of cylinder-piston sets disposed symmetrically with respect to a vertical axis of the fuel assembly, each set having a cylinder and a piston slidably received in the cylinder and defining therewith a throttled flow path into and out of a space defined by said cylinder and piston;

a fixed plate fast with said nuclear fuel assembly and fast with one of said cylinder and piston in each set;

and a movable plate arranged to receive the neutron absorbing bar upon a fall thereof, fast with the other one of said cylinder and piston in each set and movable vertically with respect to said fixed plate between a predetermined lower position close to said fixed plate where said piston has a maximum amount of engagement into said cylinder and an upper position remote from said fixed plate.

2. Device according to claim 1, wherein said cylinder and piston sets constitute at least two pairs, each of the pistons being carried by a radially extending arm of said movable plate.

3. Device according to claim 1, wherein the cylinder and the piston of each of said sets are so arranged that said fluid is forced out of the cylinder by the piston along a leak path whose cross-sectional flow area decreases as the piston penetrates into the cylinder.

4. Device according to claim 3, wherein said cross-sectional flow area is defined by a plurality of pairs of openings formed across a wall of the cylinder, said pairs being successively covered by the piston upon movement of said piston into said cylinder and by an annular gap between said piston and cylinder.

5. Device according to claim 1, futher comprising return springs each surrounding one of said sets and each compressed between said fixed plate and said movable plate.

6. Device according to claim 1, wherein said movable plate has a downwardly offset central part for decreasing the head loss impressed to the cooling fluid flowing across said fuel assembly during normal operation.

7. Device according to claim 1, wherein said fuel assembly has an upper end piece and said fixed plate is mechanically connected to said upper end piece by releasable means.

8. Device according to claim 2, wherein said bar comprises a cluster of rods carried by radial fins fast with a central pommel and each of said pistons is carried by one of said arms of said movable plate which is angularly offset with respect to the fins of said cluster.

9. In a nuclear reactor having an upstanding nuclear fuel assembly immersed in a substantially non-compressible fluid and including an upper end piece, a neutron absorbing bar including a supporting hub and a plurality of neutron absorbing rods suspended from said hub and normally positioned at least partly above said fuel assembly, said nuclear fuel assembly having means to allow insertion of said neutron absorbing bar therein, a device for absorbing the load caused by a fall of said neutron absorbing bar, said device comprising:

at least one pair of cylinder-piston sets disposed symmetrically with respect to a vertical axis of the fuel assembly, each set having a cylinder and a piston slidably received in the cylinder and defining therewith a throttled flow path into and out of a space defined by said cylinder and piston;

a fixed plate fast with said upper end piece and fast with one of said cylinder and piston in each set;

a movable plate arranged to receive the hub of the neutron absorbing bar upon a fall thereof, fast with the other one of said cylinder and piston in each set and movable vertically with respect to said fixed plate between a lower position close to said fixed plate where said piston has a maximum amount of engagement into said cylinder and an upper position remote from said fixed plate; and resilient means located within said end piece and biasing said movable plate toward said upper position.

* * * * *